United States Patent [19]
Dal Dan

[11] 3,923,110
[45] Dec. 2, 1975

[54] PRECISION DISPLACEMENT MEASURING DEVICE FOR AN ELECTRONIC READ-OUT PLATFORM SCALE

[75] Inventor: Felice Dal Dan, Rosny-sous-Bois, France

[73] Assignee: Etablissements Leonard S.A., Romainville, France

[22] Filed: Feb. 12, 1975

[21] Appl. No.: 549,439

[52] U.S. Cl. ............................ 177/210; 177/DIG. 6
[51] Int. Cl.² .......................................... G01G 3/14
[58] Field of Search ...... 177/210, 229, 255, DIG. 1, 177/DIG. 6

[56] References Cited
UNITED STATES PATENTS

| | | | |
|---|---|---|---|
| 3,148,742 | 9/1964 | Giulie | 177/DIG. 6 |
| 3,727,708 | 4/1973 | Adler et al. | 177/DIG. 6 |

Primary Examiner—George H. Miller, Jr.
Attorney, Agent, or Firm—William R. Woodward

[57] ABSTRACT

A parallelogram linkage transmits the displacement of the weighing platform to a bridging arm from which the movable member of a precision displacement measuring device is suspended. This movable member is guided in a linear path in a fixed member in which adjustable screws are provided on each side of the movable member to reduce the play of the movable member in its linear path to a minimum, without introducing any appreciable amount of friction. The movable and fixed members each carry a grating and a photoelectric detector produces pulses in response to relative movement of the gratings which are counted and displayed electronically.

3 Claims, 3 Drawing Figures

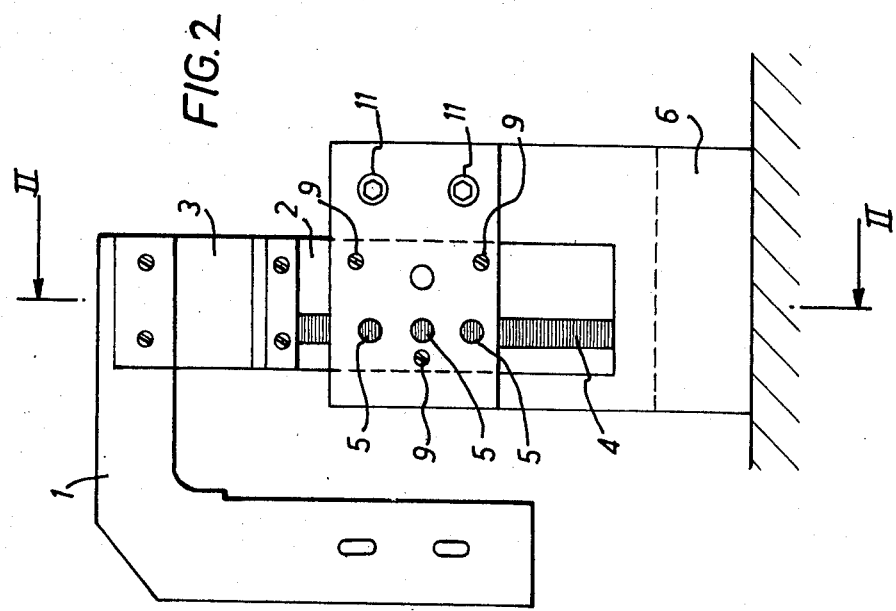
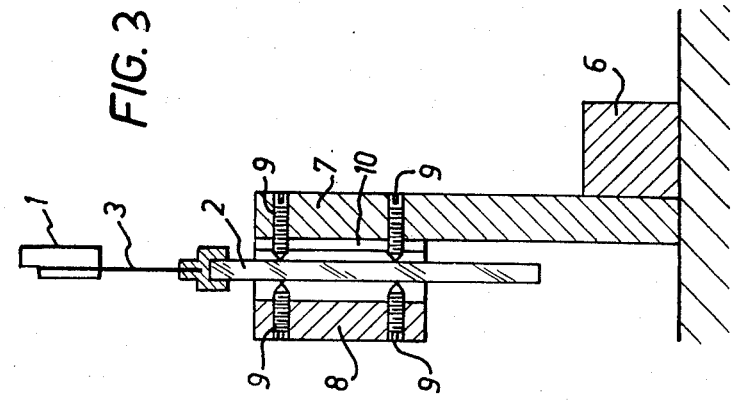

PRECISION DISPLACEMENT MEASURING DEVICE FOR AN ELECTRONIC READ-OUT PLATFORM SCALE

This invention concerns a precision displacement measuring device for supplying an electronic signal to the electronic read-out of a platform scale. In particular, the invention concerns such a measuring device for a platform scale provided with a parallelogram linkage between a displaceable platform and a movable bridging arm the displacement of which is directly measured.

It is known that in scales of the type just mentioned, the precision of measurement of the displacement of a grating, or the like, produced by the movement of the bridging arm depends upon the effectiveness of means for reducing the amount of play in the movement, even the slightest movements being able to affect the behavior of the bridging arm itself.

It is an object of the present invention to provide a device for measuring the displacement of the bridging arm in a manner which reduces to a minimum the play in the moving parts of the device, in order to reduce reaction on the displacement of the bridging arm and improve the precision of the read-out.

SUBJECT MATTER OF THE PRESENT INVENTION

Briefly, the movable grating is suspended on the bridging arm by means of a flexible sheet member that may be referred to as a flexible blade and the play of the movable grating in its vertical path is substantially eliminated by the presence of extremities of screw adjustment devices adjacent the movable member carrying the said grating. The screw adjustment means are mounted in a fixed member of the measuring device which carries a fixed grating aligned with the movable grating, so that a detecting device on the fixed member may produce pulses in response to relative movement of the gratings which are then counted and displayed in an electronic read-out indicator. The detecting device is typically a photoelectric device of known form.

The invention is further described by way of an example, to which it is not limited, by reference to the annexed drawing, in which:

FIG. 2 is a side elevation of a measuring device in accordance with the invention fastened to the bridging arm of a scale, and FIG. 3 is a section along the line II-II of the device shown in FIG. 2.

Figure 1:
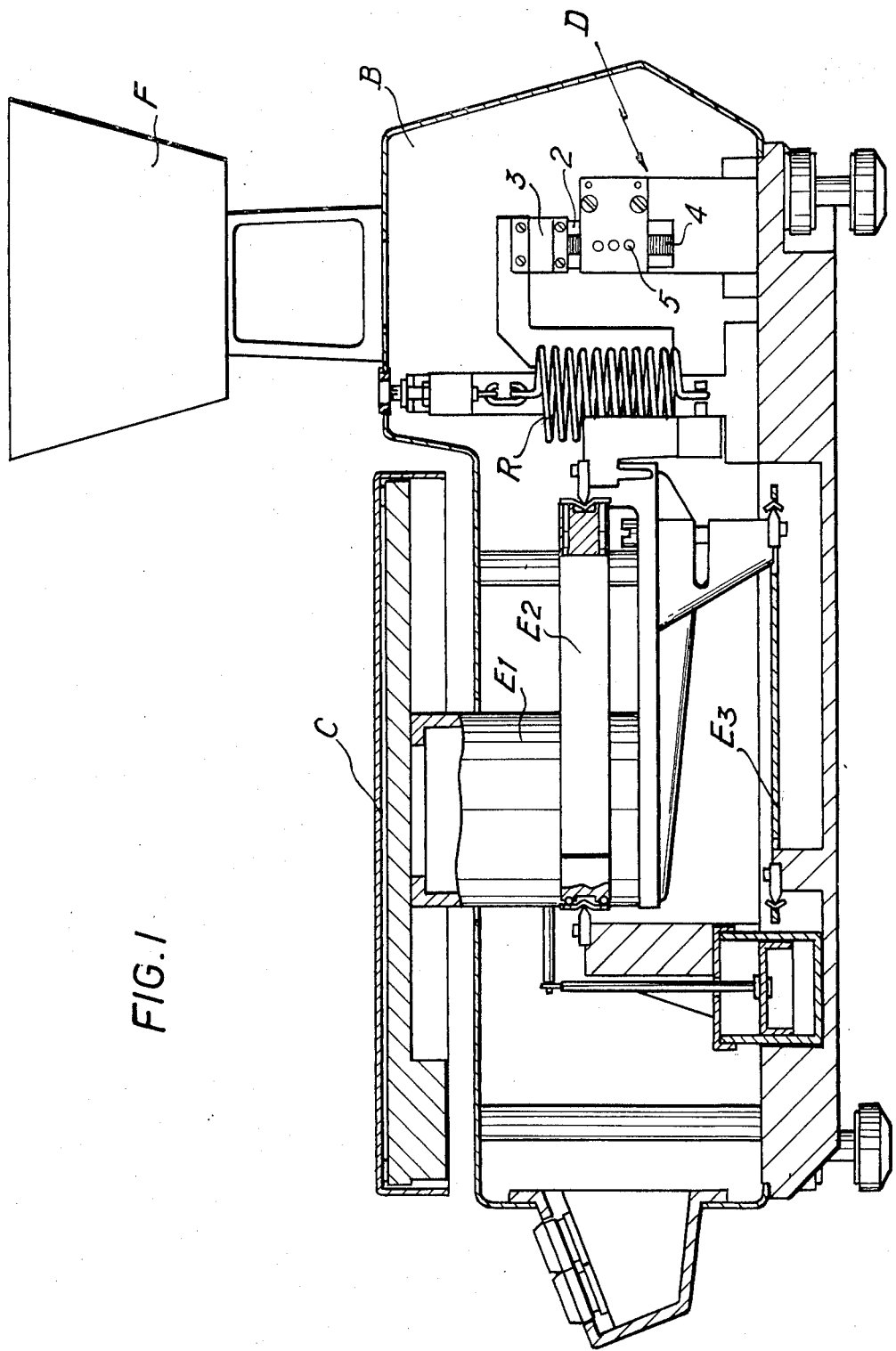
FIG. 1 is a side view, mostly in section, of a complete platform scale provided with a measuring device in accordance with the invention.

As shown in FIG. 1, the complete platform scale, generally designated B, is provided with a weighing platform C solidly affixed to the column E1 that actuates the movable parallelogram linkage formed by the members E2 and E3 that transmit to the bridging arm 1 a displacement that is to be measured by the movable grating of the measuring device that is designated generally by the reference symbol D. The usual spring against which the weighing platform operates is indicated at R and the electronic read-out indicator means is indicated at F. The measuring device that controls the read-out proper comprises elements 1 to 5, now to be described in detail by reference to FIGS. 2 and 3.

In FIGS. 2 and 3, reference numeral 1 designates the portion of the bridging arm to which the movable member 2 of the measuring counter is attached by means of a flexible blade member 3. The flexible member 2 carries the grating 4 composed of a series of horizontal lines that move vertically in front of the photoelectric counting device 5 mounted on the fixed member 6 of the measuring device, which in turn is mounted on the frame or base of the scale. The corridor formed by the parts 7 and 8 of the aforesaid fixed member is provided with precision screw devices 9. This corridor also contains the fixed grating 10. The two parts 7 and 8 forming the corridor in which the movable member 2 moves are firmly held together by means of screw fastenings 11.

When the scale is used for weighing, the grating 4 of the movable member 2 passes in front of the fixed grating 10 and the photoelectric detecting device 5 produces pulses that are counted in a known manner electronically. The count is displayed in an electronic read-out (for example, an array of light emitting diodes or gas discharge tubes to display arabic numbers) in a known manner. The advantage of the present invention is particularly found in the close guidance provided to the movable member 2 in its vertical displacement by the extremities of the precision screw-adjustment devices 9. By the adjustment of these precision screw devices, it is possible to establish a closely defined path in which the necessary movement can take place without any appreciable play and with utterly negligible friction. Cooperating with the elements just mentioned, the use of a linkage between the movable member 2 of the measuring device and the bridging arm 1, such as the flexible blade 3, assures the necessary firmness of the connection between these two elements while allowing reasonable manufacturing and assembly tolerances for the production of the precision scale.

Although the invention has been described with reference to a specific embodiment, it is understood that variations are possible within the inventive concept. For example, although edgewise play of the movable member is less of a problem than movement perpendicular to the plane of the grating, in view of the suspension on the flexible blade member 3, edgewise play could be limited by additional screws, or the extremities of the screw devices shown could protrude into grooves in the movable member, in which case it would not be necessary to use so wide a flexible blade.

1. In a platform displacement scale comprising parallelogram linkage means for transmitting the scale platform displacement, a movable bridging arm arranged to be displaced by said linkage means in proportion to said scale platform displacement and read-out means, a precision displacement measuring device comprising:
flexible suspension means depending from said bridging arm, and
counting means having an electronic output connected for operating said read-out means, said counting means comprising:
a vertically movable member suspended from said bridging arm by said suspension means and including a grating of substantially horizontal lines;
a fixed member carrying a fixed grating in alignment with said grating of said movable member and provided with means for guiding said movable member, said guiding means including screw-adjustable means for minimizing the play of said movable member in its path of motion, and detecting means provided on said fixed member for producing electronic pulses in response to relative movement of said gratings.

2. A precision displacement measuring device as defined in claim 1 in which said suspension means is in the form of a flexible blade member having one edge fixed to said bridging arm and an edge opposite thereto fixed to said movable member.

3. A precision displacement measuring device as defined in claim 2 in which said screw-adjustable means consist of three screw-adjustable devices mounted in said fixed member on each of a pair of opposite sides of said movable member.

* * * * *